(12) United States Patent
Hwang et al.

(10) Patent No.: US 10,957,896 B1
(45) Date of Patent: Mar. 23, 2021

(54) ELECTRODE HAVING ION CONDUCTION CHANNELS

(71) Applicant: EnPower, Inc., Phoenix, AZ (US)

(72) Inventors: Jonathan Hwang, Phoenix, AZ (US); Adrian Yao, Phoenix, AZ (US)

(73) Assignee: EnPower, Inc., Phoenix, AZ (US)

( * ) Notice: Subject to any disclaimer, the term of this patent is extended or adjusted under 35 U.S.C. 154(b) by 0 days.

(21) Appl. No.: 16/779,131

(22) Filed: Jan. 31, 2020

Related U.S. Application Data

(60) Provisional application No. 62/943,550, filed on Dec. 4, 2019.

(51) Int. Cl.
*H01M 4/04* (2006.01)
*H01M 4/36* (2006.01)
*H01M 10/0525* (2010.01)
*H01M 4/62* (2006.01)
*H01M 4/66* (2006.01)

(52) U.S. Cl.
CPC ......... *H01M 4/0404* (2013.01); *H01M 4/366* (2013.01); *H01M 4/621* (2013.01); *H01M 4/661* (2013.01); *H01M 10/0525* (2013.01)

(58) Field of Classification Search
CPC .... H01M 4/0404; H01M 4/366; H01M 4/621; H01M 4/661; H01M 4/624; H01M 10/0525
See application file for complete search history.

(56) References Cited

U.S. PATENT DOCUMENTS

| | | | |
|---|---|---|---|
| 2013/0202960 A1* | 8/2013 | Kim | H01M 4/64 429/209 |
| 2017/0179492 A1* | 6/2017 | Dale | H01M 10/0525 |
| 2018/0138493 A1* | 5/2018 | Liu | H01M 4/04 |

\* cited by examiner

*Primary Examiner* — Jimmy Vo
(74) *Attorney, Agent, or Firm* — Kolitch Romano LLP

(57) ABSTRACT

An electrode including conduction channels includes at least one electrode layer layered onto a current collector, the electrode layer including a plurality of active material particles and a plurality of high aspect ratio components. The high aspect ratio components are configured to provide ion conduction channels through the electrode layer. In some examples, the electrode may include two or more electrode layers, at least one of which includes high aspect ratio components. In some examples, the high aspect ratio components may be oriented transverse to the current collector to provide ion transport through a first electrode layer to a second electrode layer.

5 Claims, 10 Drawing Sheets

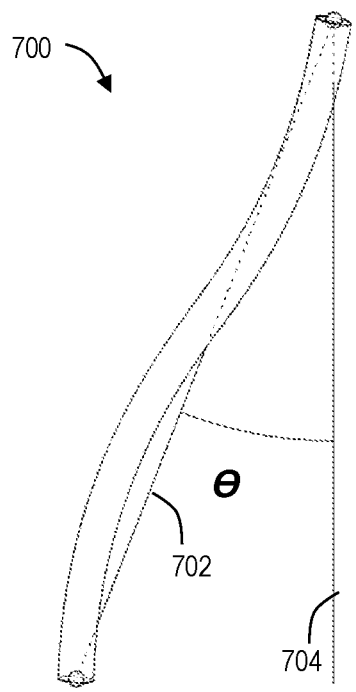 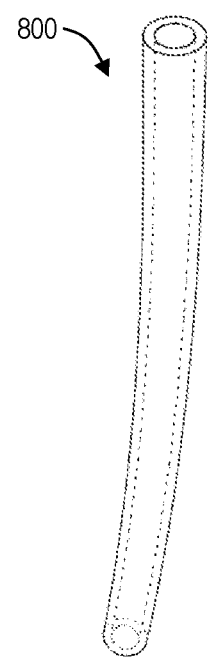
FIG. 7  FIG. 8
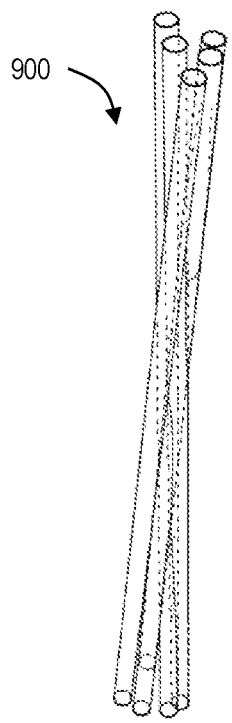 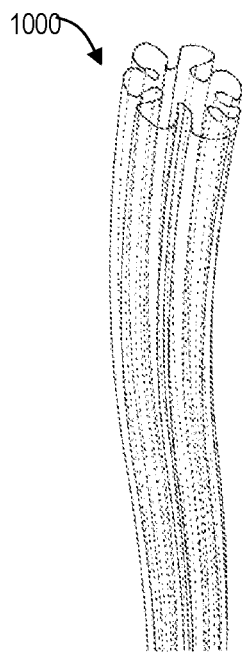
FIG. 9  FIG. 10

ELECTRODE HAVING ION CONDUCTION CHANNELS

CROSS-REFERENCES

This application claims the benefit under 35 U.S.C. § 119(e) of the priority of U.S. Provisional Patent Application Ser. No. 62/943,550, filed Dec. 4, 2019, the entirety of which is hereby incorporated by reference for all purposes.

FIELD

This disclosure relates to systems and methods for electrochemical cells. More specifically, the disclosed embodiments relate to electrodes having improved ion conduction.

INTRODUCTION

Environmentally friendly sources of energy have become increasingly critical, as fossil fuel-dependency becomes less desirable. Most non-fossil fuel energy sources, such as solar power, wind, and the like, require some sort of energy storage component to maximize usefulness. Accordingly, battery technology has become an important aspect of the future of energy production and distribution. Most pertinent to the present disclosure, the demand for secondary (i.e., rechargeable) batteries has increased. Various combinations of electrode materials and electrolytes are used in these types of batteries, such as lead acid, nickel cadmium (Ni-Cad), nickel metal hydride (NiMH), lithium ion (Li-ion), and lithium ion polymer (Li-ion polymer).

SUMMARY

The present disclosure provides systems, apparatuses, and methods relating to electrodes having ion conduction channels.

In some examples, an electrode for an electrochemical cell includes: a current collector, and an electrode layer disposed on and directly contacting the current collector, the electrode layer including a plurality of first active material particles and a plurality of ionically conductive high aspect ratio components; wherein the high aspect ratio components are configured to provide ion conduction channels throughout the electrode.

In some examples, an electrode for an electrochemical cell includes: a current collector; a first electrode layer disposed on and directly contacting the current collector, the first electrode layer including a plurality of first active material particles; and a second electrode layer disposed on and directly contacting the first electrode layer, the second electrode layer including a plurality of second active material particles and a plurality of first high aspect ratio components; wherein the first high aspect ratio components are configured to provide ion conduction channels through the second electrode layer.

In some examples, a method of manufacturing an electrode including conduction channels includes: providing a substrate; coating a first electrode layer onto the substrate, wherein the first electrode layer includes a plurality of first active material particles; coating a second electrode layer onto the first electrode layer, wherein the second electrode layer includes a plurality of second active material particles and a plurality of first high aspect ratio components; applying a magnetic field to the second electrode layer, thereby aligning the plurality of first high aspect ratio components; and drying the second electrode layer.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 7 is a schematic view of an illustrative high aspect ratio material component at an orientation angle Θ defined between a major axis of the component and a line normal to a current collector of a corresponding electrode.

FIG. 8 is an isometric view of another illustrative high aspect ratio material component.

FIG. 9 is an isometric view of another illustrative high aspect ratio material component.

FIG. 10 is an isometric view of another illustrative high aspect ratio material component.

DETAILED DESCRIPTION

Figure 1:
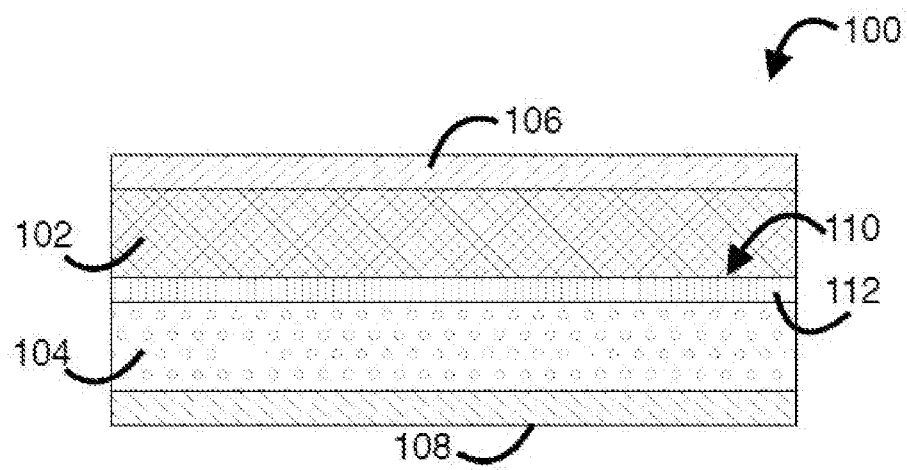
FIG. 1 is a schematic sectional view of an illustrative electrochemical cell.

Various aspects and examples of an electrode having ion conduction channels, as well as related methods, are described below and illustrated in the associated drawings. Unless otherwise specified, an electrode in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through F, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

Directional terms such as "up," "down," "vertical," "horizontal," and the like should be understood in the context of the particular object in question. For example, "horizontal" is defined as parallel to a plane defined by the current collector of an electrode and "vertical" is defined as orthogonal to the plane defined by the current collector.

"HAR" means high aspect ratio.

"Mesoporous" refers to a material containing pores having diameters of 2 nm to 500 nm.

"Macroporous" refers to a material containing pores having diameters greater than 500 nm.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

Composite electrodes for use in electrochemical cells (e.g., lithium-ion batteries) are often calendered to high densities to reduce electrode thicknesses and increase energy density. These electrodes are typically homogeneous, and include pores between active material particles which allow for ion transport through the electrode bulk. Calendering the cells to densities of greater than 1.5 g/cc for anodes and greater than 3.4 g/cc for cathodes results in high tortuosity within the electrode composite, which does not facilitate rapid mass transport of lithium ions. Homogeneous composite electrodes may therefore have poor power performance on both charge and discharge.

In general, an electrode including conduction channels according to the present disclosure includes one or more electrode layers layered on a current collector. Each electrode layer includes a plurality of active material particles adhered together by a binder. At least one of the electrode layers includes elongate, high aspect ratio (HAR) material components or members within the electrode bulk. These HAR components may be configured to provide conduction channels through the electrode bulk, granting ion access to materials situated near the current collector. The HAR material components may include surface textures, pores, score lines, perforations, corrugations, and/or any suitable surface features configured to conduct and/or transport ions.

In some examples, the HAR components are aligned in a generally vertical orientation within the electrode (e.g., oriented transverse or orthogonal to the current collector) to promote rapid ion transport through a thickness of the electrode. In some examples, the HAR components are included in a non-aligned fashion with respect to each other and with respect to the current collector, to provide a network of rapid ion transport paths. In some examples, an electrode having conduction channels includes a first layer, disposed on a top surface of the electrode, including vertically aligned HAR components, and a second layer, disposed adjacent the current collector, including non-aligned HAR components. The vertically aligned HAR components of the first layer facilitate rapid ion transport to the second layer, while the non-aligned HAR components increase utilization and/or access of active material particles in the second layer.

In some examples, the first electrode layer has a first thickness, and HAR components included in the first layer have a first average length. The first average length may be greater than or equal to the first thickness, so as to provide conduction channels between the second electrode layer and a top surface of the first electrode layer. In some examples, the second electrode layer has a second thickness, and HAR components included in the second layer have a second average length. The second average length may be greater than or equal to the second thickness.

High aspect ratio components included within the electrode may have a length-to-width or length-to-diameter ratio of at least 3:1. In some examples, the HAR components may have a length-to-width ratio or length-to-diameter ratio of 5:1, 10:1, 100:1, and/or any suitable dimensional ratio for elongate components configured to provide conduction channels. These HAR components may have a variety of forms, including but not limited to: microtubes, bundles of tubes and/or rods, fibers having corrugated and/or folded surface, fibers having etched and/or roughened surfaces, agglomerations of primary particles, fibers and/or rods having mesoporosity or macroporosity, and/or any suitable elongate structures which may assist in ion conduction. These HAR components may comprise a variety of materials, such as conductive materials (e.g., carbon fibers, etched carbon fibers, porous carbon fibers, etc.), non-conductive ceramic materials (e.g., glass fibers, alumina microrods, silica microrods, and/or microrods comprising other ceramic and/or glassy materials), non-conductive polymeric materials (e.g., nylon fibers/rods, Teflon fibers/rods, polyvinylidene difluoride (PVDF) fibers/rods, electrospun fibers, coaxially electrospun fibers, etc.), and/or any suitable materials for use in electrochemical cells. In some examples, some or all of the HAR components include magnetically responsive particles coated onto their exterior surfaces.

A method of manufacture of electrochemical cells including conduction channels may include: providing a substrate, coating a first layer of a composite electrode onto the substrate, optionally coating a second layer of a composite electrode onto the first layer, optionally aligning high aspect ratio components included in the first and/or second layers using a magnetic field, and/or calendering the electrode.

Examples, Components, and Alternatives

The following sections describe selected aspects of illustrative electrodes including conduction channels as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electrochemical Cell

This section describes an electrochemical cell including a positive and a negative electrode, with a separator disposed between them, in accordance with aspects of the present teachings. The electrochemical cell may be any bipolar electrochemical device, such as a battery (e.g., lithium-ion battery, secondary battery).

With reference to FIG. 1, an electrochemical cell 100 is illustrated schematically in the form of a lithium-ion battery. Electrochemical cell 100 includes a positive and a negative electrode, namely a cathode 102 and an anode 104. The cathode and anode are sandwiched between a pair of current collectors 106, 108, which may comprise metal foils or other suitable substrates. Current collector 106 is electrically coupled to cathode 102 and current collector 108 is electrically coupled to anode 104. The current collectors enable the flow of electrons, and thereby electrical current, into and out of each electrode. An electrolyte 110 disposed throughout the electrodes enables the transport of ions between cathode 102 and anode 104. In the present example, electrolyte 110 includes a liquid solvent and a solute of dissolved ions. Electrolyte 110 facilitates an ionic connection between cathode 102 and anode 104.

Electrolyte 110 is assisted by a separator 112, which physically partitions the space between cathode 102 and anode 104. Separator 112 is liquid permeable and enables the movement (AKA flow) of ions within electrolyte 110 and between the two electrodes. In some examples, separator 112 may be integrated within one or both of cathode 102 and anode 104. In some examples, electrolyte 110 includes a polymer gel or solid ion conductor, augmenting or replacing (and performing the function of) separator 112.

Cathode 102 and anode 104 are composite structures, which comprise active material particles, binders, conductive additives, and pores (void space) into which electrolyte 110 may penetrate. An arrangement of the constituent parts of an electrode is referred to as a microstructure, or more specifically, an electrode microstructure.

In some examples, the binder is a polymer, e.g., polyvinylidene difluoride (PVdF), and the conductive additive typically includes a nanometer-sized carbon, e.g., carbon black or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), and/or a carbon fiber.

In some examples, the chemistry of the active material particles differs between cathode 102 and anode 104. For example, anode 104 may include graphite (artificial or natural), hard carbon, titanate, titania, transition metals in general, elements in group 14 (e.g., carbon, silicon, tin, germanium, etc.), oxides, sulfides, transition metals, halides, and/or chalcogenides. In some examples, cathode 102 may include transition metals (for example, nickel, cobalt, manganese, copper, zinc, vanadium, chromium, iron), and their oxides, phosphates, phosphites, and/or silicates. In some examples, the cathode may include alkalines and alkaline earth metals, aluminum, aluminum oxides and aluminum phosphates, halides, and/or chalcogenides. In an electrochemical device, active materials participate in an electrochemical reaction or process with a working ion to store or release energy. For example, in a lithium-ion battery, the working ions are lithium ions.

Electrochemical cell 100 may include packaging (not shown). For example, packaging (e.g., a prismatic can, stainless steel tube, polymer pouch, etc.) may be utilized to constrain and position cathode 102, anode 104, current collectors 106 and 108, electrolyte 110, and separator 112.

For electrochemical cell 100 to properly function as a secondary battery, active material particles in both cathode 102 and anode 104 must be capable of storing and releasing lithium ions through the respective processes known as lithiating and delithiating. Some active materials (e.g., layered oxide materials or graphitic carbon) fulfill this function by intercalating lithium ions between crystal layers. Other active materials may have alternative lithiating and delithiating mechanisms (e.g., alloying, conversion).

When electrochemical cell 100 is being charged, anode 104 accepts lithium ions while cathode 102 donates lithium ions. When a cell is being discharged, anode 104 donates lithium ions while cathode 102 accepts lithium ions. Each composite electrode (i.e., cathode 102 and anode 104) has a rate at which it donates or accepts lithium ions that depends upon properties extrinsic to the electrode (e.g., the current passed through each electrode, the conductivity of the electrolyte 110) as well as properties intrinsic to the electrode (e.g., the solid state diffusion constant of the active material particles in the electrode; the electrode microstructure or tortuosity; the charge transfer rate at which lithium ions move from being solvated in the electrolyte to being intercalated in the active material particles of the electrode; etc).

During either mode of operation (charging or discharging) anode 104 or cathode 102 may donate or accept lithium ions at a limiting rate, where rate is defined as lithium ions per unit time, per unit current. For example, during charging, anode 104 may accept lithium at a first rate, and cathode 102 may donate lithium at a second rate. When the second rate is lesser than the first rate, the second rate of the cathode would be a limiting rate. In some examples, the differences in rates may be so dramatic as to limit the overall performance of the lithium-ion battery (e.g., cell 100). Reasons for the differences in rates may depend on an energy required to lithiate or delithiate a quantity of lithium-ions per mass of active material particles; a solid state diffusion coefficient of lithium ions in an active material particle; and/or a particle size distribution of active material within a composite electrode. In some examples, additional or alternative factors may contribute to the electrode microstructure and affect these rates.

B. Illustrative Electrode

Figure 2:
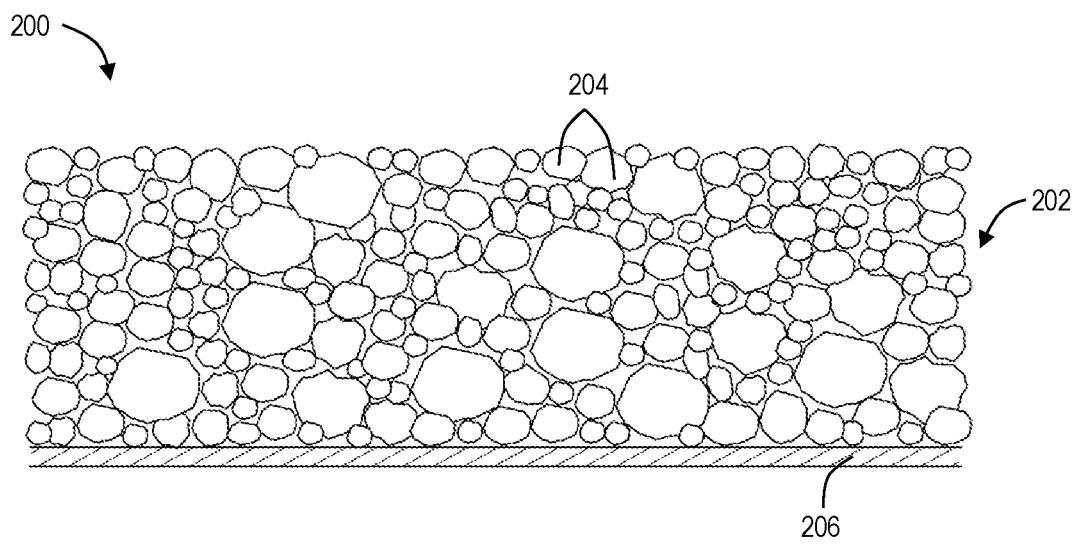
FIG. 2 is a sectional view of an illustrative electrode.

Typical composite electrodes 200 for use in electrochemical cells, as shown below in FIG. 2, include an active material composite 202 comprising a plurality of active material particles 204 adhered together by a binder, which is layered onto a current collector 206. These composite electrodes are substantially similar to cathode 102 or anode 104, as described above. Composite electrodes are typically calendered to high densities (e.g., greater than 1.5 g/cc in anodes and greater than 3.4 g/cc in cathodes) to reduce electrode thicknesses and increase energy densities. Homogeneous porous composite electrodes, such as electrode 200, may have high tortuosity as a result of calendering, and may not facilitate rapid mass transport of lithium ions through pores within and between active material particles 204. Typical composite electrodes may therefore have poor power performance during charging and discharging of electrochemical cells including the electrodes.

Figure 3:
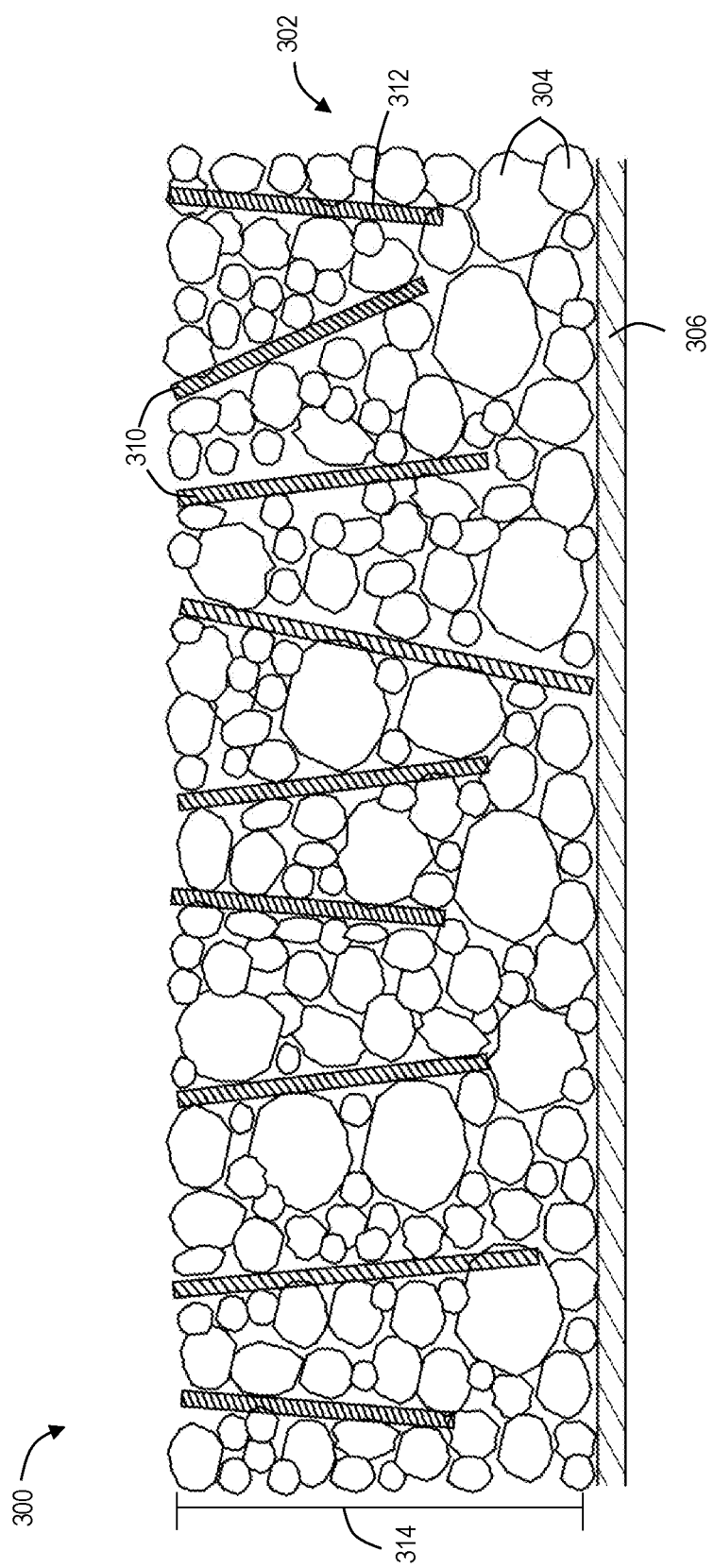
FIG. 3 is a sectional view of an illustrative single-layer electrode including conduction channels in accordance with aspects of the present disclosure.
Figure 4:
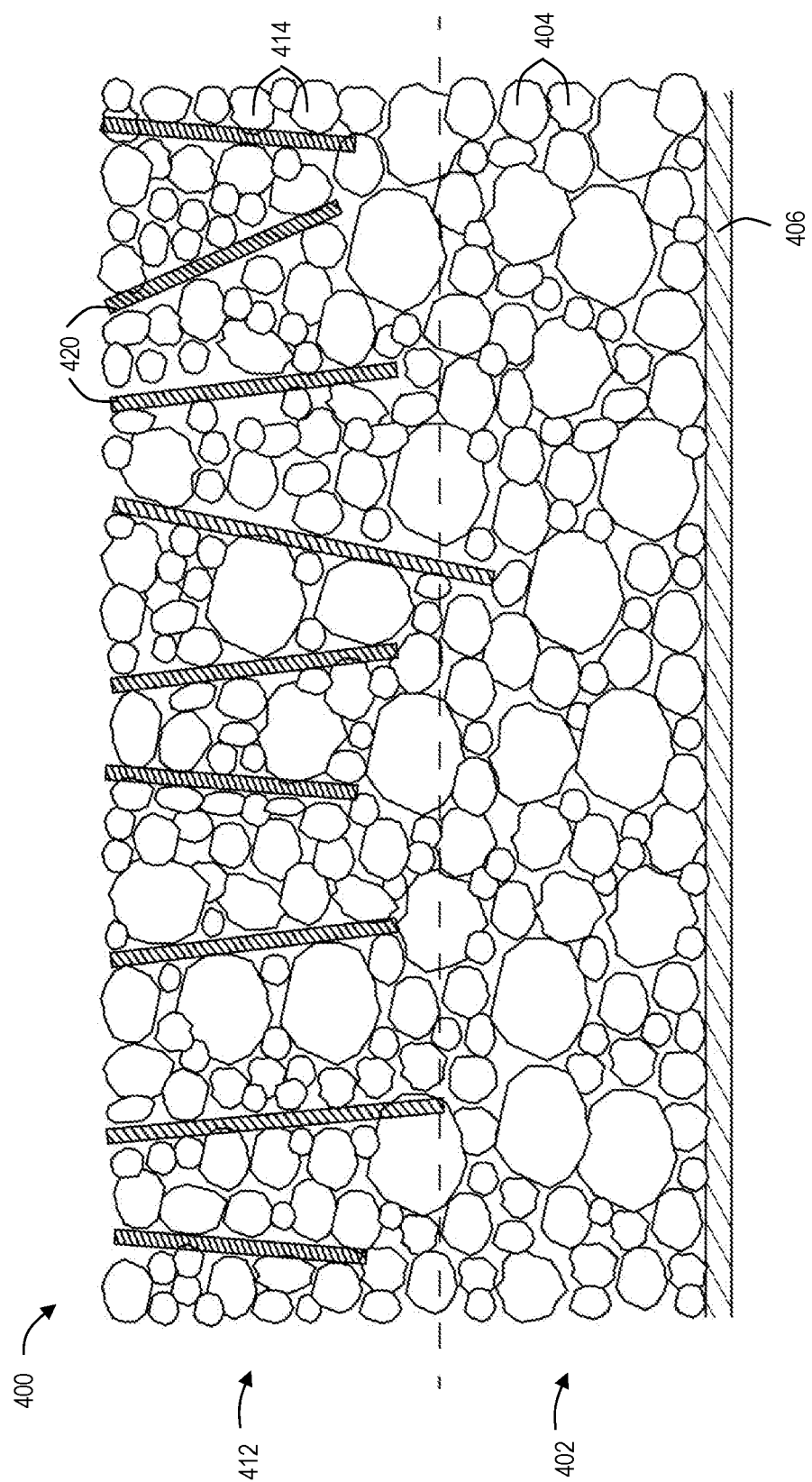
FIG. 4 is a sectional view of an illustrative multilayer electrode including conduction channels in a first layer.
Figure 5:
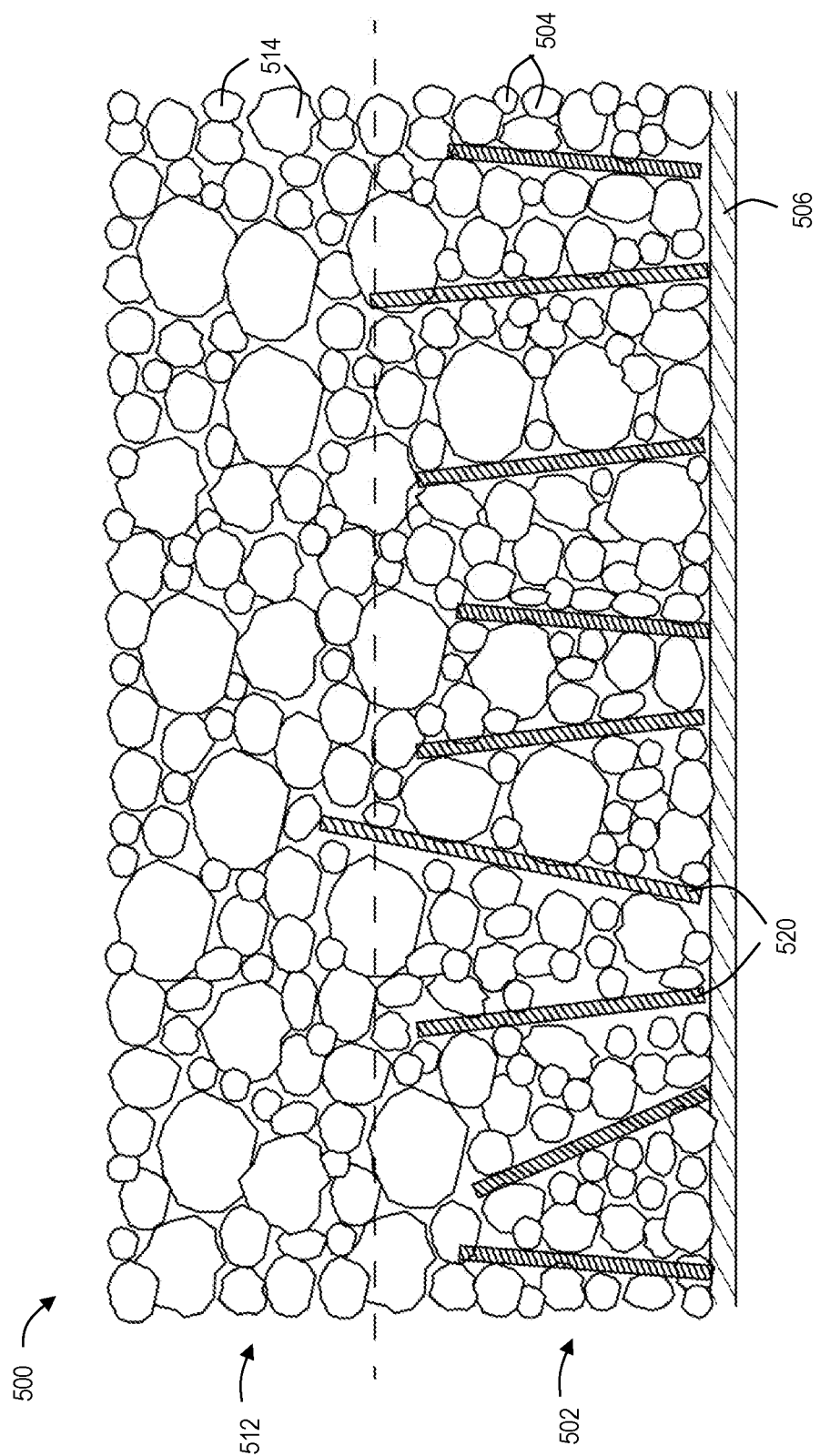
FIG. 5 is a sectional view of another illustrative multilayer electrode including conduction channels in a first layer.

Electrodes including conduction channels are illustrated in FIGS. 3-5 and described below. These electrodes include high aspect ratio (HAR) material components, which provide ion access to active materials situated closer to the current collector by creating channels for rapid mass transport. High aspect ratio components include components having any suitable length to width (diameter) ratio configured to provide these conduction channels. In the present examples, HAR components have a length to width or length to diameter ratio of at least 3 to 1. In some examples, HAR components have a length to width/diameter of at least 5 to 1, 10 to 1, 100 to 1, or higher. For example, a milled carbon fiber HAR component may have a diameter of 8 μm and a length of 80 μm, and a length to diameter ratio of 10 to 1.

In some examples, these HAR components may be oriented transverse to the current collector (e.g., aligned generally vertically) within the electrode to promote rapid ion transport through the electrode bulk. In some examples, HAR components may be oriented in a non-aligned fashion with respect to each other and/or with respect to the current collector so as to provide a network of rapid ion transport paths within a layer. In some embodiments, HAR components comprise between 1% and 50% by volume (e.g., volumetric fraction) of an electrode layer in which they are embedded.

Single-layered electrodes have an electrode thickness equal to a thickness of an active material composite included in the electrode. In some examples, HAR components included in a single-layered electrode have a length that is greater than or equal to the electrode thickness. Multi-layered electrodes include two or more electrode layers, each layer including an active material composite and having an electrode layer thickness. In some examples, HAR components included in an electrode layer of a multi-layered electrode have a length that is greater than or equal to the corresponding thickness of their layer.

FIG. 3 depicts an electrode 300, including an active material composite 302, comprising a plurality of active material particles 304 adhered together by a binder, which is layered onto current collector 306. Electrode 300 includes a plurality of high aspect ratio (HAR) components 310 disposed within the electrode bulk. HAR components 310 are oriented substantially vertically within the electrode bulk, with some or all components being substantially aligned with each other and oriented transverse to the current collector. In some examples, HAR components 310 are oriented in a non-aligned fashion. See, e.g., FIG. 5. Each HAR component has a length 312, which may be greater than a thickness 314 of active material composite 302.

FIG. 4 depicts an electrode 400 including a first active material composite 402, which is layered onto a current collector 406. A second active material composite 412 is layered onto first active material composite 402. First active material composite 402 includes a first plurality of active material particles 404 adhered together by a first binder, and second active material composite 412 includes a second plurality of active material particles 414 adhered together by a second binder. First active material particles 404 and second active material particles 414 may be substantially identical or may have different shapes and/or comprise different materials to produce a selected electrochemical profile within the electrode.

Electrode 400 includes a plurality of HAR components 420 disposed within the bulk of second active material composite 412. Components 420 may provide ion access to first active material composite 402, which is situated closer to current collector 406. HAR components 420 are oriented substantially vertically within the electrode bulk, with some or all components being substantially aligned with each other and oriented transverse to the current collector. In some examples, HAR components 420 are oriented in a non-aligned fashion.

FIG. 5 depicts an electrode 500 including a first active material composite 502, which is layered onto current collector 506. A second active material composite 512 is layered onto first active material composite 502. First active material composite 502 includes a first plurality of active material particles 504 adhered together by a first binder, and second active material composite 512 includes a second plurality of active material particles 514 adhered together by a second binder. First active material particles 504 and second active material particles 514 may be substantially identical or may have different shapes and/or comprise different materials to produce selected electrochemical profiles within the electrode.

Electrode 500 includes a plurality of HAR components 520 disposed within the bulk of first active material composite 502. Components 520 may improve ion conductivity within the first active material composite, such as in cases where first active material composite 502 has high tortuosity when compared with second active material composite 512 (e.g., due to increased densification from calendering). In some examples, HAR components 520 may facilitate rapid ion transport from upper regions (i.e., regions closer to the second active material composite) of the first active material composite to lower regions of the first active material composite (i.e., regions closer to the current collector). HAR components 520 are oriented substantially vertically within the electrode bulk, with some or all components being substantially aligned with each other and oriented transverse to the current collector. In some examples, some or all of HAR components 520 are oriented in a non-aligned fashion.

Figure 6:
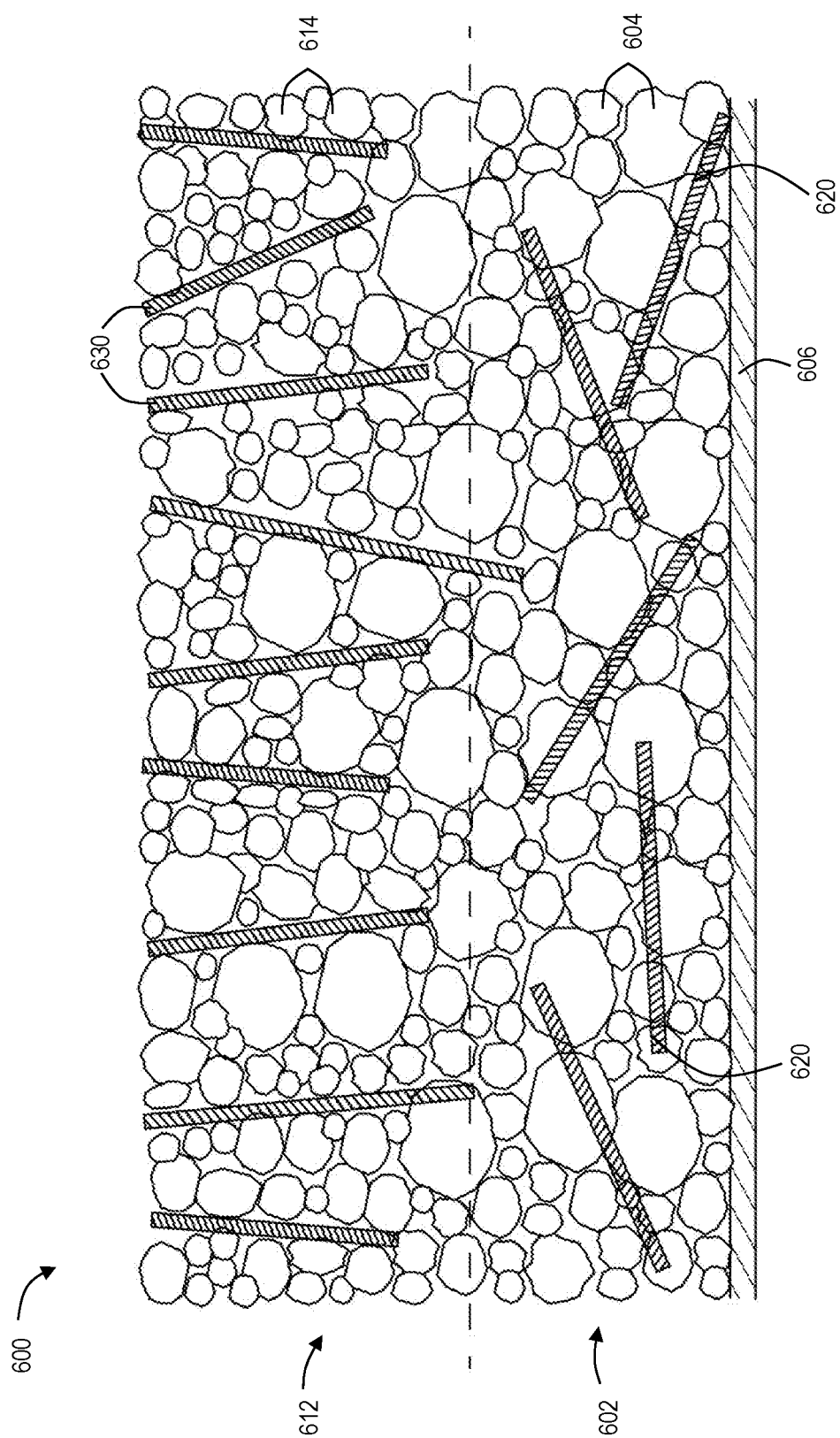
FIG. 6 is a sectional view of an illustrative multilayer electrode including conduction channels in a first layer and in a second layer.

FIG. 6 depicts an electrode 600, including a first active material composite 602, which is layered onto current collector 606. A second active material composite 612 is layered onto first active material composite 602. First active material composite 602 includes a first plurality of active material particles 604 adhered together by a first binder, and second active material composite 612 includes a second plurality of active material particles 614 adhered together by a second binder. First active material particles 604 and second active material particles 614 may be substantially identical or may have different shapes and/or comprise different materials to produce selected electrochemical profiles within the electrode.

Electrode 600 includes a first plurality of HAR components 620 components 620 disposed within the electrode bulk of first active material composite 602. Components 620 are oriented in a non-aligned fashion so as to provide a network of rapid ion paths within the electrode bulk. In some examples, components 620 are substantially aligned with each other and oriented transverse to the current collector.

Electrode 600 includes a second plurality of HAR components 630 disposed within the electrode bulk of second active material composite 612. Components 630 may provide ion access to first active material composite 602, which is situated closer to current collector 606. Components 630 are oriented vertically with respect to the electrode, and/or are oriented substantially transverse to the current collector. Components 630 may be aligned, so that they have substantially the same orientation.

High aspect ratio components included in electrodes illustrated in FIGS. 3-6 may have different orientations and/or alignments with respect to the electrode bulk. These alignments may be defined as an orientation angle, Θ, between a major axis 702 (e.g., a line drawn between a first end and a second end) of a high aspect ratio component 700 and a line 704 normal to the plane of the electrode current collector. (See FIG. 7) In some examples, such as when the HAR components are oriented transverse to the current collector (e.g., vertically), an average orientation angle (AKA average angle) of the high aspect ratio components is less than or equal to 45°. In some examples, at least 50% of the HAR components may have an orientation angle less than or equal to 45°.

C. Illustrative High Aspect Ratio Components

High aspect ratio components suitable for inclusion in electrodes, such as those illustrated in FIGS. 3-6, may comprise a variety of materials and may have a variety of suitable shapes for facilitating ion transport. The HAR material components may include surface features and/or structural features such as pores, corrugations, score lines, and/or the like which may be configured to conduct and/or transport ions. FIGS. 8-14 depict exemplary high aspect ratio components, any or all of which may be utilized in the various electrodes described herein.

FIG. 8 depicts an illustrative high aspect ratio component 800 embodied as a microtube or tubule. In some examples, component 800 has a diameter of 1-50 μm, a length of 10-100 μm, and an inside diameter of 0.1-40 μm.

FIG. 9 depicts an illustrative high aspect ratio component 900 including a bundle of elongate structures. In some examples, the elongate structures may be tubes. In some examples, the elongate structures may be rods. Tubes and/or rods included in HAR component 900 facilitate ion transport both along the component surface and between the bundled structures.

FIG. 10 depicts an illustrative high aspect ratio component 1000 including a fiber having corrugated surfaces providing ion conduction channels.

Figure 11:
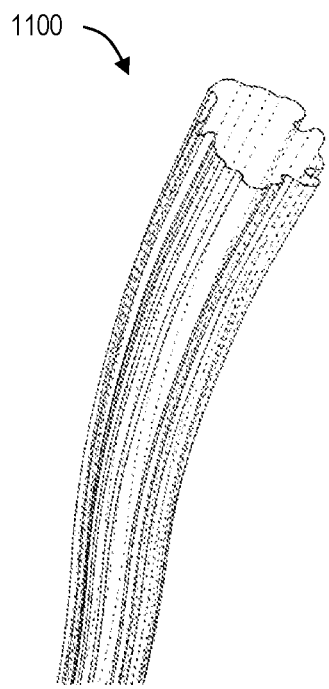
FIG. 11 is an isometric view of another illustrative high aspect ratio material component.

FIG. 11 depicts an illustrative high aspect ratio component 1100 including a fiber having folded surfaces providing ion conduction channels.

Figure 12:
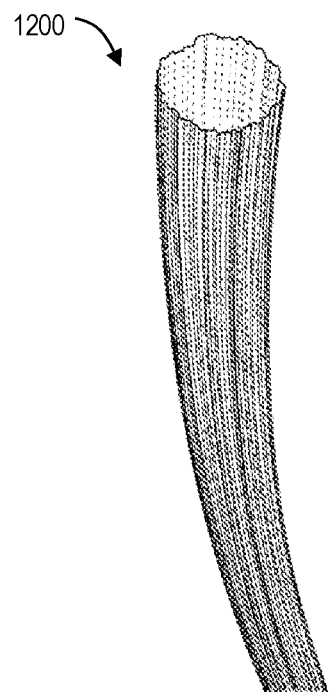
FIG. 12 is an isometric view of another illustrative high aspect ratio material component.

FIG. 12 depicts an illustrative high aspect ratio component 1200 including a fiber having etched, textured, and/or roughened surfaces providing ion conduction channels.

Figure 13:
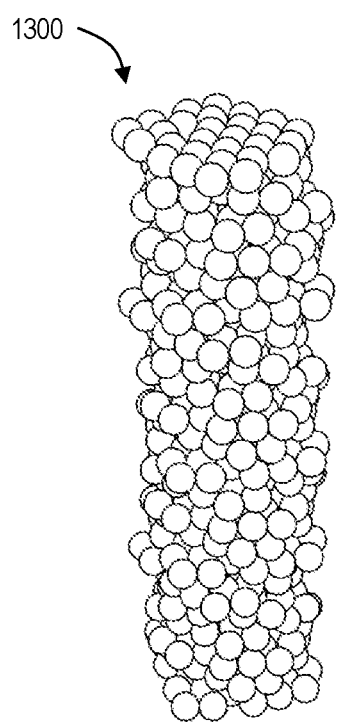
FIG. 13 is an isometric view of another illustrative high aspect ratio material component.

FIG. 13 depicts an illustrative high aspect ratio component 1300 including an agglomeration of primary particles, which form ion conduction paths in interstices of the primary particles.

Figure 14:
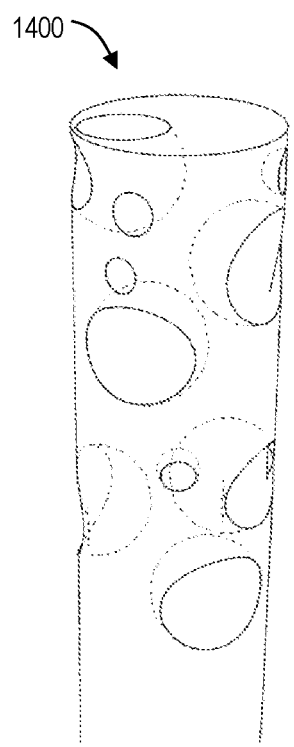
FIG. 14 is an isometric view of yet another illustrative high aspect ratio material component.

FIG. 14 depicts an illustrative high aspect ratio component 1400 including a mesoporous and/or macroporous member. The member may be a fiber and/or rod. Mesopores or macropores may be interconnected, providing ion conduction channels through the HAR component.

High aspect ratio components described above may comprise a variety of materials. In some examples, the high aspect ratio components comprise conductive materials, such as carbon fibers, etched carbon fibers, porous carbon fibers, and/or the like. In some examples, the high aspect ratio components comprise non-conductive ceramic materials, such as glass fibers, alumina microrods, silica microrods, and/or microrods comprising ceramic and/or glassy materials. In some examples, the high aspect ratio components comprise non-conductive polymeric materials, such as nylon fibers and/or rods, polytetrafluoroethylene (PTFE) fibers and/or rods, polyvinylidene difluoride (PVDF) fibers and/or rods, electrospun fibers, coaxially electrospun fibers, and/or the like. In some examples, the HAR components include magnetically responsive particles, including ferromagnetic materials such as iron, nickel, cobalt, oxides and/or alloys, coated onto exterior surfaces.

D. Illustrative Manufacturing Method

Figure 15:
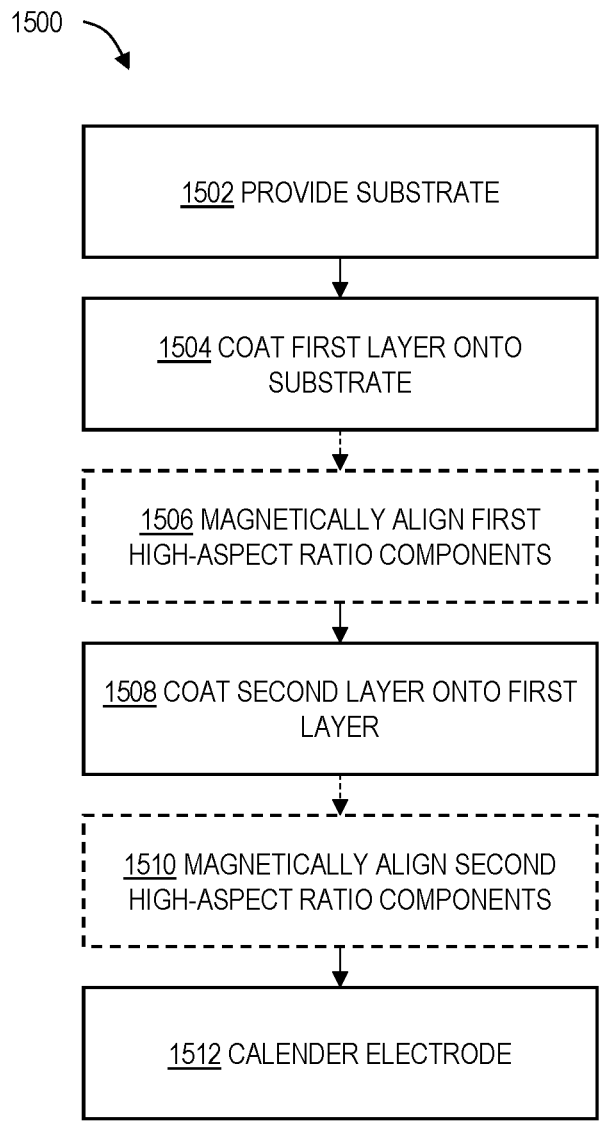
FIG. 15 is a flow chart depicting steps of an illustrative method for manufacturing an electrode including conduction channels according to the present teachings.
Figure 16:
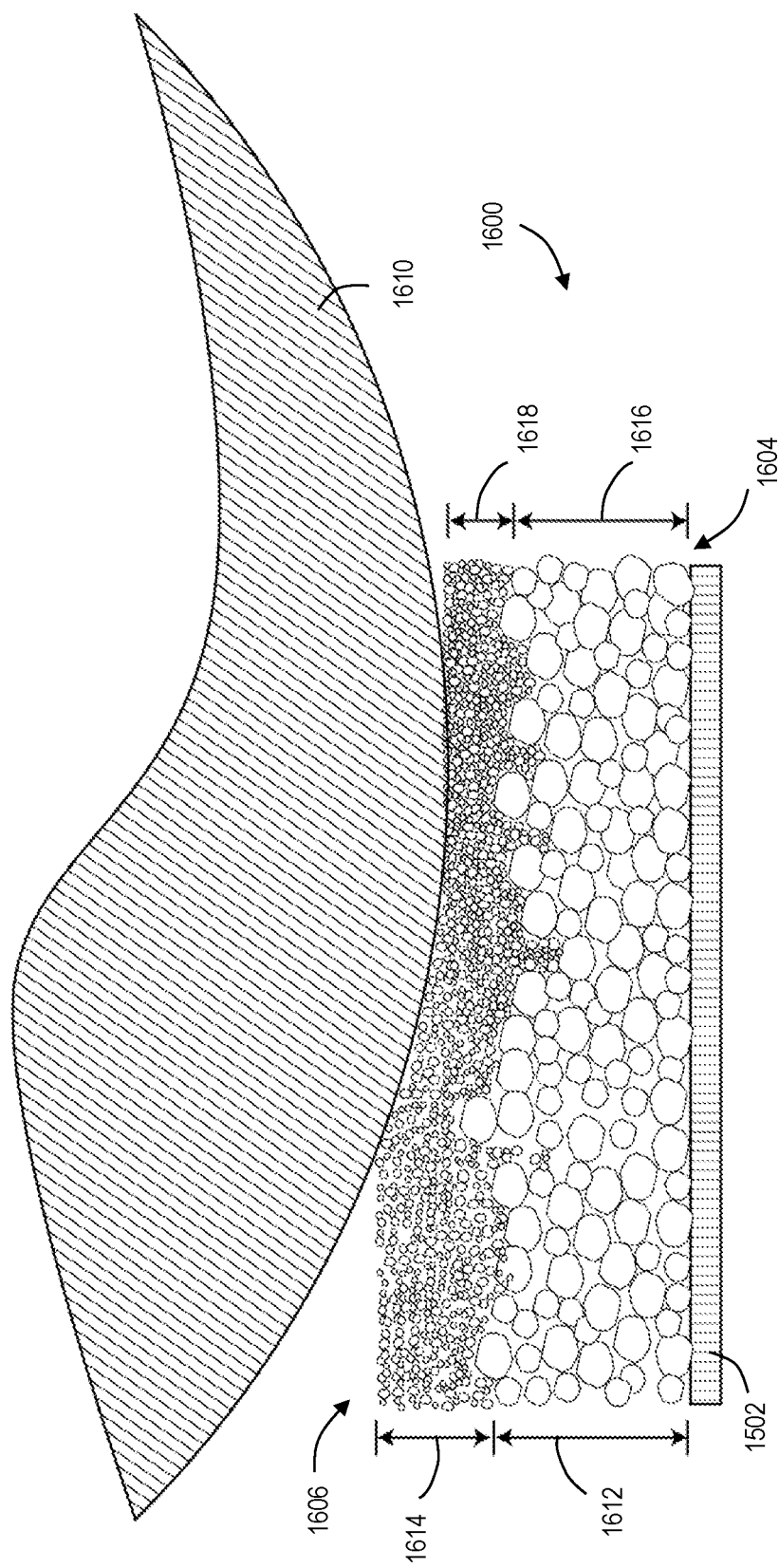
FIG. 16 is a sectional view of an illustrative electrode undergoing a calendering process in accordance with aspects of the present disclosure.
Figure 17:
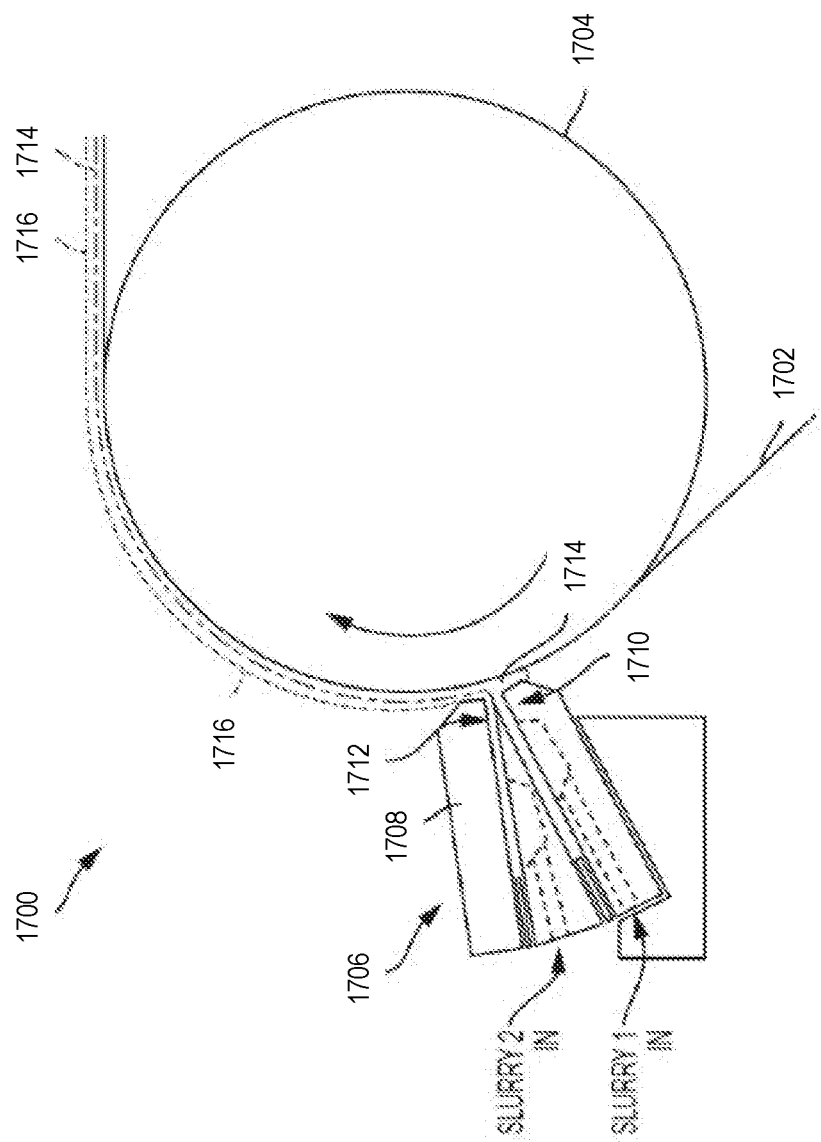
FIG. 17 is a schematic diagram of an illustrative manufacturing system suitable for manufacturing electrodes and electrochemical cells of the present disclosure.

The following describes steps of an illustrative method 1500 for forming an electrode including conduction channels; see FIGS. 15-17.

Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

FIG. 15 is a flowchart illustrating steps performed in an illustrative method, and may not recite the complete process or all steps of the method. Although various steps of method 1500 are described below and depicted in FIG. 15, the steps need not necessarily all be performed, and in some cases may be performed simultaneously, or in a different order than the order shown.

Step 1502 of method 1500 includes providing a substrate, wherein the substrate includes any suitable structure and material configured to function as a conductor in a secondary battery of the type described herein. In some examples, the substrate comprises a current collector. In some examples, the substrate comprises a metal foil. The term "providing" here may include receiving, obtaining, purchasing, manufacturing, generating, processing, preprocessing, and/or the like, such that the substrate is in a state and configuration for the following steps to be carried out.

Method 1500 next includes a plurality of steps in which at least a portion of the substrate is coated with an electrode material composite. This may be done by causing a current collector substrate and an electrode material composite dispenser to move relative to each other, by causing the substrate to move past an electrode material composite dispenser (or vice versa) that coats the substrate as described below. The composition of material particles in each electrode material composite layer may be selected to achieve the benefits, characteristics, and results described herein. The electrode material composite may include one or more electrode layers including a plurality of active material particles. In some examples, the electrode material composite may include high aspect ratio components incorporated into the electrode layers.

Step 1504 of method 1500 includes coating a first layer of a composite electrode on a first side of the substrate. In some examples, the first layer may include a plurality of first particles adhered together by a first binder, the first particles having a first average particle size (or other first particle distribution). In some examples, the plurality of first particles may comprise a plurality of first active material particles. In some examples, the composite electrode is an anode suitable for inclusion within an electrochemical cell. In this case, the first particles may comprise graphite (artificial or natural), hard carbon, titanate, titania, transition metals in general, elements in group 14 (e.g., carbon, silicon, tin, germanium, etc.), oxides, sulfides, transition metals, halides, and/or chalcogenides. In some examples, the composite electrode is a cathode suitable for inclusion within an electrochemical cell. In this case, the first particles may comprise transition metals (for example, nickel, cobalt, manganese, copper, zinc, vanadium, chromium, iron), and their oxides, phosphates, phosphites, and/or silicates. In some examples, the cathode active material particles may include alkalines and alkaline earth metals, aluminum, aluminum oxides and aluminum phosphates, halides, and/or chalcogenides.

In some examples, the first layer may further include a plurality of first high aspect ratio components configured to provide conduction channels within and/or through the first layer. These first high aspect ratio components may include microtubes, bundles of tubes and/or rods, fibers having corrugated and/or folded surface, fibers having etched and/or roughened surfaces, agglomerations of primary particles, fibers and/or rods having mesoporosity or macroporosity, and/or any suitable elongate structures which may assist in ion conduction. The first high aspect ratio components may comprise a variety of materials, such as conductive materials, non-conductive ceramic materials, non-conductive polymeric materials, and/or any suitable materials for use in electrochemical cells. In some examples, the first high aspect ratio components may include magnetically responsive particles coated onto their exterior surfaces. High aspect ratio components include components having any suitable length to width (diameter) ratio for elongate components configured to provide conduction channels. HAR components may be have a length to width or length to diameter ratio of at least 3 to 1. In some examples, HAR components may have a length to width/diameter of at least 5 to 1, 10 to 1, 100 to 1, or higher. For example, a milled carbon fiber HAR component may have a diameter of 8 µm and a length of 80 µm and a length to diameter ratio of 10 to 1.

The coating process of step 1504 may include any suitable coating method(s), such as simultaneous dual-extrusion. Additionally or alternatively, suitable coating methods may include: slot die, blade coating, spray-based coating, electrostatic jet coating, or the like. In some examples, the first layer is coated as a wet slurry of solvent, e.g., water or NMP(N-Methyl-2-pyrrolidone), binder, conductive additive, and active material. In some examples, the first layer is coated dry, as an active material with a binder and/or a conductive additive.

In some examples, step 1504 may be followed by optional step 1506, which includes aligning the high aspect ratio components included in the first layer. For example, a magnetic field may be applied to the first electrode layer before or during a drying step wherein the first electrode layer is dried in an oven. In some examples, drying the electrode includes a form of heating and energy transport to and from the electrode (e.g., convection, conduction, radiation) to expedite the drying process. In some examples, a magnetic field may be applied to the first electrode layer as the electrode is moved through the oven in a reel-to-reel process. Drying the first electrode layer may fix the first high aspect ratio components in a desired (e.g., aligned) orientation. In some examples, the first high aspect ratio components may not be magnetically aligned. A random orientation of non-magnetically aligned high aspect ratio components within the first layer may increase ion penetration throughout the first layer. Drying the first electrode layer when the first high aspect ratio components are not magnetically aligned may fix the first high aspect ratio components in a desired (e.g., non-aligned) orientation.

Step 1508 of method 1500 includes coating a second layer onto the first layer, forming a multilayered (e.g., stratified) structure. The second layer may include a plurality of second particles adhered together by a second binder, the second particles having a second average particle size (or other second particle distribution). In some examples, the plurality of second particles may comprise a plurality of second active material particles. In some examples, the composite electrode is an anode suitable for inclusion within an electrochemical cell. In this case, the second particles may comprise graphite (artificial or natural), hard carbon, titanate, titania, transition metals in general, elements in group 14 (e.g., carbon, silicon, tin, germanium, etc.), oxides, sulfides, transition metals, halides, and/or chalcogenides. In some examples, the composite electrode is a cathode suitable for inclusion within an electrochemical cell. In this case, the second particles may comprise transition metals (for example, nickel, cobalt, manganese, copper, zinc, vanadium, chromium, iron), and their oxides, phosphates, phosphites, and/or silicates. In some examples, the cathode active material particles may include alkalines and alkaline earth metals, aluminum, aluminum oxides and aluminum phosphates, halides, and/or chalcogenides.

In some examples, the second layer may further include a plurality of second high aspect ratio components configured to provide conduction channels within the second layer. These second high aspect ratio components may include microtubes, bundles of tubes and/or rods, fibers having corrugated and/or folded surface, fibers having etched and/or roughened surfaces, agglomerations of primary particles, fibers and/or rods having mesoporosity or macroporosity, and/or any suitable elongate structures which may assist in ion conduction. The second high aspect ratio components may comprise a variety of materials, such as conductive materials, non-conductive ceramic materials, non-conductive polymeric materials, and/or any suitable materials for use in electrochemical cells. In some examples, the second high aspect ratio components may include magnetically responsive particles coated onto their exterior surfaces.

The coating process of step 1508 may include any suitable coating method(s), such as simultaneous dual-extrusion. Additionally or alternatively, suitable coating methods may include: slot die, blade coating, spray-based coating, electrostatic jet coating, or the like. In some examples, the second layer is coated as a wet slurry of solvent, e.g., water or NMP(N-Methyl-2-pyrrolidone), binder, conductive additive, and active material. In some examples, the second layer is coated dry, as an active material with a binder and/or a conductive additive.

In some examples, step 1508 may be followed by optional step 1510, which includes aligning the second high aspect ratio components. For example, a magnetic field may be applied to the second electrode layer before or during drying of the second electrode layer in an oven. In some examples, drying the electrode includes a form of heating and energy transport to and from the electrode (e.g., convection, conduction, radiation) to expedite the drying process. In some examples, a magnetic field may be applied to the second electrode layer as the electrode is moved through the oven in a reel-to-reel process. An aligned orientation of second high aspect ratio components may provide ion conduction channels through the second layer to the first layer. Drying the second electrode layer may fix the second high aspect ratio components in a desired (e.g., aligned) orientation. In some examples, the second high aspect ratio components may not be magnetically aligned.

In some examples, any of the described steps may be repeated to form three or more layers. For example, an additional layer or layers may include active materials to form an electrode having three or more layers. In some examples, an additional layer may include a plurality of ceramic separator particles, forming an integrated separator layer. Any method described herein to impart structure between the first active material layer and the second active material layer may be utilized to form similar structures between any additional layers deposited during the manufacturing process.

In some examples, steps 1504 and 1508 may be performed substantially simultaneously. For example, both of the slurries may be extruded through their respective orifices simultaneously. This forms a two-layer slurry bead and coating on the moving substrate. In some examples, difference in viscosities, difference in surface tensions, difference in densities, difference in solids contents, and/or different solvents used between the first active material slurry and the second active material slurry may be tailored to cause interpenetrating finger structures at the boundary between the two composite layers. In some embodiments, the viscosities, surface tensions, densities, solids contents, and/or solvents may be substantially similar. Creation of interpenetrating structures, if desired, may be facilitated by turbulent flow, e.g., at the wet interface between the first active material slurry and the second active material slurry, creating partial intermixing of the two slurries.

In some examples, method 1500 may further include calendering the composite electrode in step 1512 (e.g., in a hot roll process). Both the first and second layers may experience the calendering process as a combined structure. In some examples, calendering is replaced with another compression, pressing, or compaction process. In some examples, calendering the electrode may be performed by pressing the combined first and second layers against the substrate, such that electrode density is increased in a non-uniform manner, with the first layer having a first porosity and the second layer having a lower second porosity. In some examples, calendering the composite electrode may slightly increase an orientation angle between major axes of the first and second high aspect ratio components and the current collector.

FIG. 16 shows an electrode undergoing the calendering process, in which particles in a second layer 1606 can be calendered with a first layer 1604. This may prevent a "crust" formation on the electrode, specifically on the first active material layer. A roller 1610 may apply pressure to a fully assembled electrode 1600. Electrode 1600 may include first layer 1604 and second layer 1606 applied to a substrate web 1602. First layer 1604 may have a first uncompressed thickness 1612 and second layer 1606 may have a second uncompressed thickness 1614 prior to calendering. After the electrode has been calendered, first layer 1604 may have a first compressed thickness 1616 and second layer 1606 may have a second compressed thickness 1618.

E. Illustrative Manufacturing System

Turning to FIG. 17, an illustrative manufacturing system 1700 for use with method 1500 will now be described. In some examples, a slot-die coating head with at least two fluid slots, fluid cavities, fluid lines, and fluid pumps may be used to manufacture a battery electrode featuring two or more active material layers including conduction channels. In some examples, additional cavities may be used to create additional active material layers.

In system 1700, a foil substrate 1702 is transported by a revolving backing roll 1704 past a stationary dispenser device 1706. Dispenser device 1706 may include any suitable dispenser configured to evenly coat one or more layers of slurry onto the substrate. In some examples, the substrate may be held stationary while the dispenser head moves. In some examples, both may be in motion. Dispenser device 1706 may, for example, include a dual chamber slot die coating device having a coating head 1708 with two orifices 1710 and 1612. A slurry delivery system may supply two different slurries to the coating head under pressure. Due to the revolving nature of backing roll 1704, material exiting the lower orifice or slot 1710 will contact substrate 1702 before material exiting the upper orifice or slot 1712. Accordingly, a first layer 1714 will be applied to the substrate and a second layer 1716 will be applied on top of the first layer. In the present disclosure, the first layer 1714 may be the active material of an electrode and the second layer may be a separator layer.

Manufacturing method 1500 may be performed using a dual-slot configuration, as described above, to simultaneously extrude two electrode material layers, or a multi-slot configuration with three or more dispensing orifices used to simultaneously extrude a multilayered electrode having three or more layers. In some embodiments, manufacturing system 1700 may include a tri-slot configuration, such that a first active material layer, a second active material layer, and a third active material layer may all be extruded simultaneously.

F. Illustrative Combinations and Additional Examples

This section describes additional aspects and features of electrodes including conduction channels, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An electrode for an electrochemical cell, the electrode comprising:
  a current collector,
  an electrode layer disposed on and directly contacting the current collector, the electrode layer including a plurality of first active material particles and a plurality of ionically conductive high aspect ratio components;
  wherein the high aspect ratio components are configured to provide ion conduction channels throughout the electrode, A1. The electrode of A0, wherein each of the high aspect ratio components have a length to width ratio of at least 3 to 1.

A2. The electrode of A0 or A1, wherein the high aspect ratio components are oriented transverse to the current collector.

A3. The electrode of A2, wherein the high aspect ratio components have an average angle, wherein the average angle is an average of angles between a major axis of a single high aspect ratio component and a line normal to a plane of the current collector.

A4. The electrode of A3, wherein the average angle is less than or equal to 45°.

A5. The electrode of any of A0 through A4, wherein the high aspect ratio components are oriented in a non-aligned fashion with respect to each other and with respect to the current collector.

A6. The electrode of any of A0 through A5, wherein the high aspect ratio components comprise between 1% and 50% by volume of the electrode layer.

A7. The electrode of any of A0 through A6, wherein the high aspect ratio components include microtubes.

A8. The electrode of A7, wherein the high aspect ratio components have a diameter of 1-50 μm, a length of 10-100 μm, and an inside diameter of 0.1-40 μm.

A9. The electrode of any of A0 through A6, wherein the high aspect ratio components include bundles of elongate structures.

A10. The electrode of A9, wherein the elongate structures include tubes.

A11. The electrode of A9, wherein the elongate structures include rods.

A12. The electrode of any of A0 through A6, wherein the high aspect ratio components include fibers having corrugated surfaces.

A13. The electrode of any of A0 through A6, wherein the high aspect ratio components include fibers having folded surfaces.

A14. The electrode of any of A0 through A6, wherein the high aspect ratio components include fibers having etched surfaces.

A15. The electrode of any of A0 through A6, wherein the high aspect ratio components include fibers having roughened surfaces.

A16. The electrode of any of A0 through A6, wherein the high aspect ratio components include agglomerations of primary particles.

A17. The electrode of any of A0 through A6, wherein the high aspect ratio components are mesoporous or microporous.

A18. The electrode of any of A0 through A17, wherein the high aspect ratio components comprise conductive materials.

A19. The electrode of any of A0 through A17, wherein the high aspect ratio components comprise non-conductive ceramic materials.

A20. The electrode of any of A0 through A17, wherein the high aspect ratio components comprise non-conductive polymeric materials.

A21. The electrode of any of A0 through A20, wherein the high aspect ratio components include magnetically responsive particles coated on their exterior surfaces.

A22. The electrode of any of A0 through A21, wherein the high aspect ratio components have an average length and wherein the electrode layer has a thickness, and wherein the average length of the high aspect ratio components is greater than or equal to the electrode layer thickness.

A23. The electrode of any of A0 through A22, wherein each of the high aspect ratio components has an orientation angle, wherein the orientation angle is defined as an angle between a major axis of respective high aspect ratio components and a line normal to a plane of the current collector, and wherein at least 50% of the high aspect ratio components have an orientation angle less than or equal to 45°.

B0. An electrode for an electrochemical cell, the electrode comprising:
a current collector;
a first electrode layer disposed on and directly contacting the current collector, the first electrode layer including a plurality of first active material particles;
a second electrode layer disposed on and directly contacting the first electrode layer, the second electrode layer including a plurality of second active material particles and a plurality of first high aspect ratio components;
wherein the first high aspect ratio components are configured to provide ion conduction channels through the second layer.

B1. The electrode of B0, wherein the first high aspect ratio components have a length to width ratio of at least 3 to 1.

B2. The electrode of B0 or B1, wherein the first high aspect ratio components are oriented transverse to the current collector.

B3. The electrode of any of B0 through B2, wherein the first high aspect ratio components comprise between 1% and 50% by volume of the second electrode layer.

B4. The electrode of any of B0 through B3, wherein the first high aspect ratio components are configured to provide ion access to the first electrode layer.

B5. The electrode of any of B0 through B4, wherein the first high aspect ratio components have an average angle, wherein the average angle is an average of angles between a major axis of a single high aspect ratio component and a line normal to a plane of the current collector.

B6. The electrode of B5, wherein the average angle is less than or equal to 45°.

B7. The electrode of any of B0 through B6, wherein the first high aspect ratio components include microtubes.

B8. The electrode of B7, wherein the first high aspect ratio components have a diameter of 1-50 μm, a length of 10-100 μm, and an inside diameter of 0.1-40 μm.

B9. The electrode of any of B0 through B6, wherein the first high aspect ratio components include bundles of first elongate structures.

B10. The electrode of B9, wherein the first elongate structures include tubes.

B11. The electrode of B9, wherein the first elongate structures include rods.

B12. The electrode of any of B0 through B6, wherein the first high aspect ratio components include fibers having corrugated surfaces.

B13. The electrode of any of B0 through B6, wherein the first high aspect ratio components include fibers having folded surfaces.

B14. The electrode of any of B0 through B6, wherein the first high aspect ratio components include fibers having etched surfaces.

B15. The electrode of any of B0 through B6, wherein the first high aspect ratio components include fibers having roughened surfaces.

B16. The electrode of any of B0 through B6, wherein the first high aspect ratio components include agglomerations of primary particles.

B17. The electrode of any of B0 through B6, wherein the first high aspect ratio components are mesoporous or microporous.

B18. The electrode of any of B0 through B17, wherein the first high aspect ratio components comprise conductive materials.

B19. The electrode of any of B0 through B17, wherein the first high aspect ratio components comprise non-conductive ceramic materials.

B20. The electrode of any of B0 through B17, wherein the first high aspect ratio components comprise non-conductive polymeric materials.

B21. The electrode of any of B0 through B20, wherein the first high aspect ratio components include magnetically responsive particles coated on their exterior surfaces.

B22. The electrode of any of B0 through B21, wherein the first electrode layer further includes a plurality of second high aspect ratio components, wherein the second high aspect ratio components are configured to provide ion conduction channels throughout the first electrode layer.

B23. The electrode of B22, wherein the second high aspect ratio components have a length to width ratio of at least 3 to 1.

B24. The electrode of B22 or B23, wherein the second high aspect ratio components are oriented in a non-aligned fashion with respect to each other and with respect to the current collector.

B25. The electrode of any of B22 through B24, wherein the second high aspect ratio components comprise between 1% and 50% by volume of the first electrode layer.

B26. The electrode of any of B22 through B25, wherein the second high aspect ratio components are configured to provide a network of rapid ion paths within the first electrode layer.

B27. The electrode of any of B0 through B26, wherein the second high aspect ratio components include microtubes.

B28. The electrode of B27, wherein the second high aspect ratio components have a diameter of 1-50 μm, a length of 10-100 μm, and an inside diameter of 0.1-40 μm.

B29. The electrode of any of B0 through B26, wherein the second high aspect ratio components include bundles of second elongate structures.

B30. The electrode of B29, wherein the second elongate structures include tubes.

B31. The electrode of B29, wherein the second elongate structures include rods.

B32. The electrode of any of B0 through B26, wherein the second high aspect ratio components include fibers having corrugated surfaces.

B33. The electrode of any of B0 through B26, wherein the second high aspect ratio components include fibers having folded surfaces.

B34. The electrode of any of B0 through B26, wherein the second high aspect ratio components include fibers having etched surfaces.

B35. The electrode of any of B0 through B26, wherein the second high aspect ratio components include fibers having roughened surfaces.

B36. The electrode of any of B0 through B26, wherein the second high aspect ratio components include agglomerations of primary particles.

B37. The electrode of any of B0 through B26, wherein the second high aspect ratio components are mesoporous or microporous.

B38. The electrode of any of B0 through B37, wherein the second high aspect ratio components comprise conductive materials.

B39. The electrode of any of B0 through B37, wherein the second high aspect ratio components comprise non-conductive ceramic materials.

B40. The electrode of any of B0 through B37, wherein the second high aspect ratio components comprise non-conductive polymeric materials.

B41. The electrode of any of B0 through B40, wherein the first high aspect ratio components include magnetically responsive particles coated on their exterior surfaces.

B42. The electrode of any of B0 through B41, wherein the first high aspect ratio components have a first average length and wherein the second electrode layer has a first thickness, and wherein the first average length is greater than or equal to the first thickness.

B43. The electrode of any of B22 through B42, wherein the second high aspect ratio components have a second average length and wherein the first electrode layer has a second thickness, and wherein the second average length is greater than or equal to the second thickness.

B44. The electrode of any of B0 through B42, wherein each of the first high aspect ratio components has an orientation angle, wherein the orientation angle is defined as an angle between a major axis of respective first high aspect ratio components and a line normal to a plane of the current collector, and wherein at least 50% of the first high aspect ratio components have an orientation angle less than or equal to 45°.

B45. The electrode of any of B22 through B42, wherein each of the second high aspect ratio components has an orientation angle, wherein the orientation angle is defined as an angle between a major axis of respective second high aspect ratio components and a line normal to a plane of the current collector, and wherein at least 50% of the second high aspect ratio components have an orientation angle less than or equal to 45°.

C0. A method of manufacturing an electrode including conduction channels, the method comprising:
  providing a substrate; and
  coating a first electrode layer onto the substrate, wherein the first electrode layer includes a plurality of first active material particles and a plurality of first high aspect ratio components;
  wherein the first high aspect ratio components are configured to provide ion conduction channels throughout the electrode.

C1. The method of C0, further comprising applying a magnetic field to the first electrode layer, thereby aligning the plurality of first high aspect ratio components.

C2. The method of C0 or C1, further comprising drying the first electrode layer.

C3. The method of any of C0 through C2, further comprising coating a second electrode layer onto the first electrode layer, wherein the second electrode layer includes a plurality of second active material particles and a plurality of second high aspect ratio components.

C4. The method of C3, further comprising applying a magnetic field to the second electrode layer, thereby aligning the plurality of second high aspect ratio components.

C5. The method of C3 or C4, further comprising drying the second electrode layer.

C6. The method of any of C0 through C5, further comprising calendering the electrode.

D0. A method of manufacturing an electrode including conduction channels, the method comprising:
  providing a substrate;
  coating a first electrode layer onto the substrate, wherein the first electrode layer includes a plurality of first active material particles;
  drying the first electrode layer;
  coating a second electrode layer onto the first electrode layer, wherein the second electrode layer includes a plurality of second active material particles and a plurality of first high aspect ratio components;
  applying a magnetic field to the second electrode layer, thereby aligning the plurality of first high aspect ratio components; and
  drying the second electrode layer.

D1. The method of D0, further comprising calendering the electrode.

D2. The method of D0 or D1, wherein the first electrode layer further includes a plurality of second high aspect ratio components.

D3. The method of any of D0 through D2, wherein the steps of applying the magnetic field to the second electrode layer and drying the second electrode layer are performed substantially simultaneously.

D4. The method of any of D0 through D3, wherein the first high aspect ratio components have an average angle, wherein the average angle is an average of angles between a major axis of a single high aspect ratio component and a line normal to the plane of the substrate, and wherein the average angle is less than or equal to 45°.

D5. The electrode of any of D0 through D4, wherein each of the first high aspect ratio components has an orientation angle, wherein the orientation angle is defined as an angle between a major axis of respective first high aspect ratio components and a line normal to a plane of the current collector, and wherein at least 50% of the first high aspect ratio components have an orientation angle less than or equal to 45°.

E0. A method of manufacturing an electrochemical cell including conduction channels, the method comprising:
 providing a substrate;
 coating a first electrode layer onto the substrate, wherein the first electrode layer includes a plurality of first active material particles and a plurality of first high aspect ratio components;
 drying the first electrode layer;
 coating a second electrode layer onto the first electrode layer, wherein the second electrode layer includes a plurality of second active material particles and a plurality of second high aspect ratio components;
 applying a magnetic field to the second electrode layer, thereby aligning the plurality of high aspect ratio components; and
 drying the second electrode layer.

E1. The method of E0, further comprising calendering the electrode.

Advantages, Features, and Benefits

The different embodiments and examples of the electrodes including conduction channels described herein provide several advantages over known solutions for increasing ion conductivity. For example, illustrative embodiments and examples described herein provide conduction channels through the electrode bulk to grant ion access to materials situated closer to the current collector.

Additionally, and among other benefits, illustrative embodiments and examples described herein allow rapid ion transport through the electrode bulk. In some examples, the electrode architecture provides ion access to the bottom layer of the electrode. In some examples, the electrode architecture provides a network of rapid ion paths.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of manufacturing an electrode including conduction channels, the method comprising:
 providing a substrate;
 coating a first electrode layer onto the substrate, wherein the first electrode layer includes a plurality of first active material particles having a first particle shape;
 coating a second electrode layer onto the first electrode layer, wherein the second electrode layer includes a plurality of second active material particles having a second particle shape different from the first particle shape and a plurality of first high aspect ratio components;
 applying a magnetic field to the second electrode layer, thereby aligning the plurality of first high aspect ratio components such that each of the first high aspect ratio components has a first end disposed within the first electrode layer and a second end disposed within the second electrode layer, and such that each of the first high aspect ratio components is configured to provide an ion conduction channel through the second electrode layer; and
 drying the second electrode layer.

2. The method of claim 1, further comprising calendering the electrode.

3. The method of claim 1, wherein the first electrode layer further includes a plurality of second high aspect ratio components.

4. The method of claim 1, wherein the steps of applying the magnetic field to the second electrode layer and drying the second electrode layer are performed substantially simultaneously.

5. The method of claim 1, wherein each of the first high aspect ratio components has an orientation angle, wherein the orientation angle is defined as an angle between a major axis of respective first high aspect ratio components and a line normal to a plane of the substrate, and wherein at least 50% of the first high aspect ratio components have an orientation angle less than or equal to 45°.

* * * * *